US008772015B2

(12) United States Patent
Husain et al.

(10) Patent No.: US 8,772,015 B2
(45) Date of Patent: Jul. 8, 2014

(54) BIOFILTER MEDIA TO REMOVE ODOUR CAUSING COMPOUNDS FROM WASTE GAS STREAMS

(75) Inventors: Hidayat Husain, Oakville (CA); Brian P. Herner, Georgetown (CA)

(73) Assignee: Biorem Technologies Inc., Guelph (CA)

( * ) Notice: Subject to any disclaimer, the term of this patent is extended or adjusted under 35 U.S.C. 154(b) by 978 days.

(21) Appl. No.: 12/245,327

(22) Filed: Oct. 3, 2008

(65) Prior Publication Data

US 2009/0093042 A1 Apr. 9, 2009

Related U.S. Application Data

(60) Provisional application No. 60/977,493, filed on Oct. 4, 2007, provisional application No. 60/979,605, filed on Oct. 12, 2007, provisional application No. 60/979,619, filed on Oct. 12, 2007.

(51) Int. Cl.
| | |
|---|---|
| B01D 53/34 | (2006.01) |
| B01D 53/52 | (2006.01) |
| B01D 53/44 | (2006.01) |
| B01D 53/48 | (2006.01) |
| B01D 53/85 | (2006.01) |

(52) U.S. Cl.
USPC .................. 435/266; 435/299.1; 435/252.1; 435/264

(58) Field of Classification Search
None
See application file for complete search history.

(56) References Cited

U.S. PATENT DOCUMENTS

| | | | |
|---|---|---|---|
| 5,232,676 A | 8/1993 | Wolff et al. | |
| 5,534,154 A | 7/1996 | Gillham | |
| 5,618,730 A | 4/1997 | Eder et al. | |
| 5,747,331 A | 5/1998 | Hartikainen et al. | |
| 5,837,142 A | 11/1998 | Mullerheim et al. | |
| 5,855,797 A | 1/1999 | Luong et al. | |
| 5,861,303 A | 1/1999 | Barshter et al. | |
| 5,869,323 A | 2/1999 | Horn | |
| 5,876,606 A | 3/1999 | Blowes et al. | |
| 5,891,711 A | 4/1999 | Carter | |
| 5,908,561 A * | 6/1999 | Palm et al. ............... | 210/777 |
| 5,981,272 A | 11/1999 | Chang | |
| 6,019,810 A | 2/2000 | Phillips et al. | |
| 6,056,934 A | 5/2000 | Carlsen et al. | |
| 6,171,853 B1 | 1/2001 | Kim | |
| 6,271,020 B1 | 8/2001 | Coleman | |
| 6,291,233 B1 | 9/2001 | Saha et al. | |
| 6,294,373 B1 | 9/2001 | van Lith | |
| 6,358,729 B1 | 3/2002 | Ferranti | |
| 6,395,522 B1 | 5/2002 | DeFilippi et al. | |
| 6,403,366 B1 | 6/2002 | Kim | |
| 6,479,276 B1 | 11/2002 | Thom et al. | |
| 6,632,659 B1 | 10/2003 | Den et al. | |
| 6,790,653 B2 | 9/2004 | Cooke | |
| 6,916,446 B1 | 7/2005 | Miller et al. | |
| 6,936,446 B2 | 8/2005 | Kallenbach et al. | |
| 2001/0034056 A1 | 10/2001 | Corey | |
| 2002/0170858 A1 | 11/2002 | Maddux et al. | |
| 2003/0027325 A1 | 2/2003 | Shen et al. | |
| 2004/0251573 A1 | 12/2004 | Schmid | |
| 2005/0084949 A1 | 4/2005 | Shareefdeen et al. | |
| 2006/0027099 A1 | 2/2006 | Kim | |
| 2008/0085547 A1 | 4/2008 | Herner et al. | |
| 2008/0096268 A1 | 4/2008 | Herner et al. | |

FOREIGN PATENT DOCUMENTS

| | | |
|---|---|---|
| CA | 2211564 | 1/1999 |
| CA | 2424515 | 4/2002 |
| EP | 0414095 B1 | 2/1991 |
| EP | 0497214 B1 | 8/1992 |
| EP | 669155 A1 | 8/1995 |
| GB | 233636-1 A | 10/1999 |
| JP | 01315317 A | 12/1989 |
| JP | 04363111 A | 12/1992 |
| JP | 08323136 A | 12/1996 |
| JP | 2000296310 A | 10/2000 |
| JP | 2004113893 A | 4/2004 |

OTHER PUBLICATIONS

Charles R. Dixon, "The Application of Sand Technology for Turf Systems", Turf Diagnostics & Design, 1994, http://www.turfdiag.com/sand_technology.htm.

Chris Easter et al., "Biofilters and Biotowers for Treating Odors and Volatile Organic Compounds", pp. 328-346, Water Environment Federation, Odors and Air Emissions, 2006.

English language machine translation of JP08323136A (Dec. 10, 1996).

English language machine translation of JP2004113893A (Apr. 15, 2004).

* cited by examiner

*Primary Examiner* — David T Fox
*Assistant Examiner* — Jeffrey Bolland
(74) *Attorney, Agent, or Firm* — Scott Pundsack; Borden Ladner Gervais LLP

(57) ABSTRACT

A biofilter media has one or more of a set of desired physical characteristics. The set of physical characteristics includes a sphericity of 0.75 to 1, a particle size of 1 to 16 or 4 to 8 mm, a uniformity coefficient of 2 or less and a surface area of 800 to 2000 $m^2/m^3$ of media. The media is coated, supports microorganisms and is used to treat a waste gas stream.

13 Claims, 2 Drawing Sheets

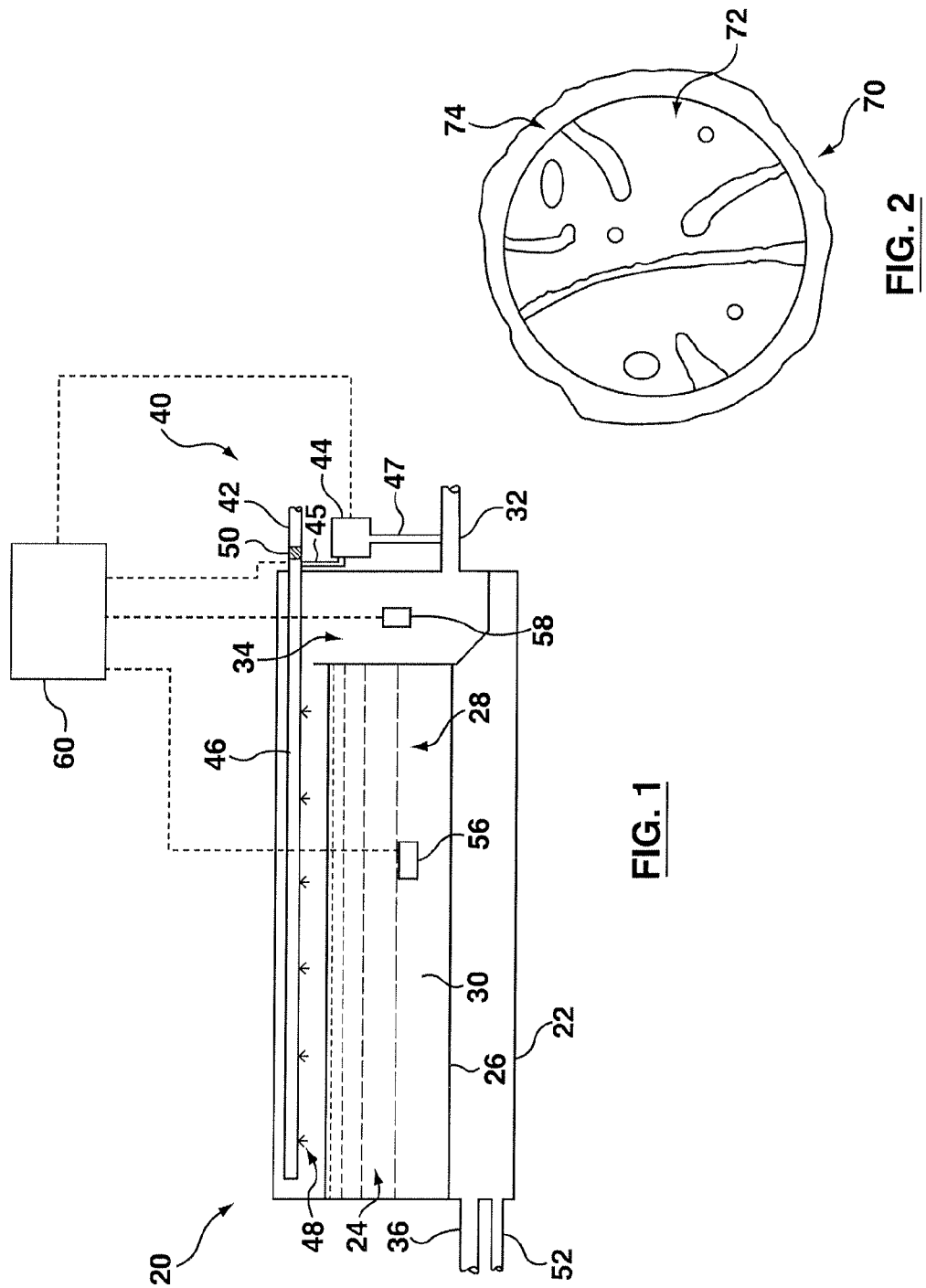

Pressure drop comparison

Pressure drop comparison of invention with comparable media with poor sphericity

BIOFILTER MEDIA TO REMOVE ODOUR CAUSING COMPOUNDS FROM WASTE GAS STREAMS

CROSS-REFERENCES TO RELATED APPLICATIONS

This application claims the benefit of U.S. Provisional Patent Applications 60/977,493 (filed on Oct. 4, 2007), 60/979,605 (filed on Oct. 12, 2007), and 60/979,619 (filed on Oct. 12, 2007). U.S. Provisional Applications 60/977,493 and 60/979,605 are incorporated herein in their entirety by this reference to them.

FIELD

This specification relates to biofilter systems, biofilter media employed in such systems, and methods of using such systems to remove odour causing compounds from waste gas streams.

BACKGROUND

The following is not an admission that anything discussed below is prior art or part of the common knowledge of persons skilled in the art.

Biofiltration is an air pollution control technique that has been used to control odour and remove volatile organic compounds (VOC) from waste gas streams generated by wastewater treatment plants and chemical plants, as well as various rendering, food processing, flavour manufacturing and composting facilities.

In a typical biofilter, a waste gas stream is urged to flow through a moist, biologically active, packed bed. The bed contains microorganisms that are immobilized on a thin biofilm that is formed on the surface of the packing material. The microorganisms serve as the biocatalysts in the contaminant degradation process. They transform air contaminants into biomass and other products through their metabolic activities.

The process underlying the operation of a biofilter is a multi-step process that involves phase transfer, adsorption and biodegradation. As a first step, contaminants are transferred from the gaseous phase to the liquid phase. Once in the liquid phase, the contaminants are adsorbed to the biofilter media (also referred to as packing material). Thereafter, the contaminants are biodegraded within the biofilm. The overall efficiency of the biofiltration process is affected by the relative rates of phase transfer, adsorption and the biological reactions.

Several different biofilter media have been used in the past. These may fall in one of two categories: naturally bioactive, and inert. For both types of media, biofilters are typically sized to provide sufficient contact time with the biofilter media in order to achieve phase transfer, adsorption, and biodegradation of odorous compounds. This contact time is referred to as the empty bed residence time, or EBRT. Generally, EBRTs between 30 and 120 seconds are common. However, for both naturally bioactive and inert biofilter media, it has been found that EBRTs below 45 seconds may cut into required safety factors in order to maintain reliable odor treatment (Easter et al., 2006).

Bioactive packing materials may include soil, peat, compost, bark and manure. These materials can retain water and generally contain enough nutrients to sustain an initial microbial population. These materials have been used in many applications because they tend to be abundantly available and are generally inexpensive. However, this type of biofilter media has encountered various drawbacks in the field. Biofilters using these materials tend to require large filter beds on account of the low biodegradation rate and the significant bulk density of the media that tends to limit the filter bed height. Additionally, these media tend to degrade over time. They lose their water retaining characteristics and settling of the media due to biomass growth tends to occur. Eventually, biofilters using this type of media may experience a loss of performance due to a significant gas phase pressure drop in the media and channeling of the waste gas through the filter bed.

Inert biofilter media are porous materials (either naturally occurring or synthetic) that usually require inoculation of microorganisms. Examples of inert biofilter media that have been used in previous biofilter applications include wood chips, activated carbon, gas-aerated concrete, gravel, lava rock, ceramics and polymeric foams. Some synthetic biofilter media have yielded better contaminant removal rates and generally performed better than bioactive packing materials. This is due in part to the fact that they tend to have a larger surface area and have been able to achieve a better distribution of gas flow through the media. However, clogging, compaction and excessive gas-phase pressure drop due to extensive biomass growth still remain a serious problem for these types of biofilter media. These issues can severely impact performance of the biofilter causing a decline in the contaminant removal efficiency.

An example of a synthetic filter media is described in European Patent No. 0 497 214 (Fattinger). The biofilter media has a hydrophilic core coated with a hydrophobic layer. The hydrophilic core is populated by microorganisms. The core is a granular material made from a porous substance, such as gas-aerated concrete, swelling clay or pumice, whereas the hydrophobic layer can be activated charcoal or adsorption resin. A bonding agent may also be used when applying the hydrophobic layer to the hydrophilic core. Fattinger also discloses that this biofilter media may be used to purify exhaust air containing toluene, xylene, ethyl acetate and benzene. This packing material tends to suffer from clogging problems.

A biofilter system using the packing material of Fattinger to remove hydrogen sulfide from waste gas streams was described in U.S. Pat. No. 6,358,729 (Ferranti). Ferranti describes a plant for the depuration of air polluted with odorous substances, such as hydrogen sulfide, mercaptans and dimethyl disulfide. The plant includes a prescrubbing section, a filtering bed and post-scrubbing section, all placed in sequence. The filtering bed of Ferranti preferably consists of particles of a filtering material made in accordance with Fattinger. The compact plant has a high empty bed residence time (EBRT) for $H_2S$ removal at high concentrations. In addition, it was found not to be particularly efficient in removing recalcitrant reduced sulfur compounds from the waste gas streams.

United States Patent Publication No. 2005/0084949 (Shareefdeen) describes another synthetic biofilter media, which is currently made commercially available by the assignee of the present application, BIOREM Technologies Inc. of Guelph, Ontario under the name BIOSORBENS™. This media has had greater success in removing hydrogen sulfide from waste gas streams. The biofilter media has a porous hydrophilic nucleus and a hydrophobic coating on the hydrophilic nucleus. The hydrophilic nucleus is formed of aggregates whose primary ingredients preferably include silica and alumina. The hydrophobic coating includes a metallic agent, microorganisms, nutrients, organic carbon, an alkaline buffer, a bonding agent, an adsorptive agent, and a hydrophobic agent. The inclusion of a metallic agent (preferably iron) in the biofilter media allows the removal of sulfur by the formation of iron sulfide and also serves to enhance the conversion and biological processing of sulfur compounds in the contaminated air. The metallic agent acts as catalyst to increase the rate of biological oxidation and enhance the activity of the microorganisms.

The removal of reduced sulfur compounds from waste gas streams presents a major challenge. While biofilters have been used successfully to remove hydrogen sulfide from waste gas streams, certain reduced sulfur compounds, such as mercaptans and the methyl sulfides (especially dimethyl disulfide) have tended to resist such treatment on account of their relative stability and low solubility in aqueous solutions.

SUMMARY

The following summary is intended to introduce the reader to the more detailed discussion to follow. The summary is not intended to define or limit the claims.

A biofilter media will be described. The media, or a core material for the media, has one or more of a set of desired physical characteristics. The set of physical characteristics includes a sphericity of 0.75 to 1, a particle size of 1 to 16 or 4 to 8 mm, a uniformity coefficient of 2 or less and a surface area per volume of 800 to 2000 $m^2/m^3$. The media has a coating and supports microorganisms. The media may be used to treat a waste gas stream.

The sphericity value of between 0.75 and 1 makes it possible to use fine media in the range of 1-16 mm diameter, preferably 4-8 mm diameter, without adverse effects that would be created by using media of this size having a lesser sphericity. This particle size provides a surface area in the range of 800 to 2000 m2/m3 or 1000-1500 m2/m3 of media volume, which is 1.5 to 2 times the surface area per volume of Biosorbens™ media, described hereinabove. Surprisingly, a media of this sphericity and particle size is also resistant to fouling and reduces inter-particle moisture retention resulting from irrigation compared to other media, and so provides more consistent performance due to the elimination of increased mass transfer resistance in the liquid phase that degrades performance immediately after irrigation.

Having a uniformity coefficient of less than 2 may further assist in achieving a low pressure drop.

In tests, it has been found that a media or core as described above allows a biofilter system to be operated at a surprisingly low EBRT. Biofilter systems with such media have been operated with EBRT's under 30 seconds and under 20 seconds, for example about 15 seconds, while still yielding high removal of odour causing contaminants.

BRIEF DESCRIPTION OF THE DRAWINGS

FIG. 1 is a simplified illustration of an example of biofilter system having a biofilter media;

FIG. 2 is an illustration of an example of a biofilter media;

DETAILED DESCRIPTION

Figure 3:
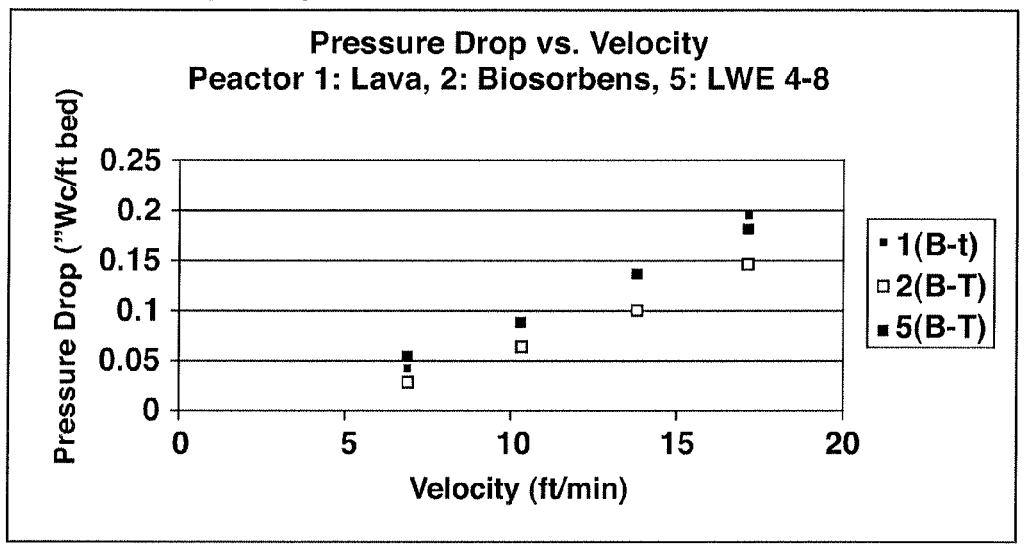
FIG. 3 is a graphical presentation of pressure drop achieved using the biofilter media as described herein as compared with two other media.

Various products or processes will be described below including an example of each claimed invention. No example described below limits any claimed invention and any claimed invention may cover processes or products that are not described below. The claimed inventions are not limited to products or processes having all of the features of any one product or process described below or to features common to multiple or all of the products or processes described below. It is possible that a product or process described below is not an example of any claimed invention. All rights are reserved in any invention disclosed in a product or process that is not claimed in this document. Any one or more features of any one or more examples can be combined with any one or more features of any one or more other examples.

In the following specification, the terms "biofilter" or "biofilter system" refer to a system that employs microorganisms to effect biodegradation of contaminants in a waste gas stream. The term "biofilter media" refers to the packing material used in the filter beds of such systems. Furthermore, the term "contaminants" or "air contaminants" refer to chemical compounds present in waste gas streams. Examples of contaminants include hydrogen sulfide ("$H_2S$"), reduced sulfur compounds, for instance, methyl mercaptan, dimethyl sulfide and dimethyl disulfide, other sulfur containing compounds or volatile organic compounds ("VOCs"), such as chlorinated organics. Further, the terms "contaminated air stream" or "waste gas stream" refer to a flow of air/gas that contains contaminants.

A biofilter may treat contaminants by flowing a waste gas stream through a layer or bed of media comprising a plurality of granules. The granules comprise a core having a coating thereon. The core is preferably expanded glass, although other materials may be used. The coating may include one or more of, and preferably all of, a bonding agent, an adsorptive agent, and nutrients for microorganisms. In use, the coating supports microorganisms that act on the contaminants. A seeding of microorganisms may have been provided as part of the coating, or may be provided after coating.

The bonding agent may be cement. The adsorptive agent may be activated carbon. The microorganisms and nutrients may be provided by peat or compost. The microorganisms may include at least one of *Pseudomonas pseudoalcaligenes, Pseudoxanthomonas, Paenibaccilus lautus. Thiobacillus thioparus* and *Thiobacillus thiooxidans*. The nutrients may include phosphorus, nitrogen and potassium and may further include zinc acetate. The coating may further include an acid, preferably phosphoric acid.

A biofilter system may include a housing having an inlet for receiving contaminated air, and an outlet for exhausting cleaned air. The biofilter system also includes a media provided in the housing. The biofilter system may include a water delivery system for providing moisture to the biofilter media. The moisture provided by the water delivery system may be in the form of one of water and steam. The water delivery system may include a steam generator for supplying steam to the biofilter media and may include irrigation conduits to deliver the water to the biofilter media. Nozzles may be operatively connected to the irrigation conduits for spraying water onto the biofilter media. A flow meter may help control the flow of water through the irrigation conduits.

There may be a drain line in fluid communication with the biofilter media for removing excess water therefrom.

The biofilter system may include sensor means operatively connected to the biofilter media. The sensor means may include a temperature sensor for measuring the temperature of the biofilter media and a pressure sensor for measuring the pressure at which the contaminated air flows through the biofilter media. Optionally, the sensor means may include a pH monitoring probe. The pH monitoring probe may be disposed in the outlet.

A biofilter system may include a control system operatively connected to the water delivery system and the sensor means. The control system is operable to actuate the water delivery system in response to input received from the sensor means. Additionally, the sensor means may include a temperature sensor for measuring the temperature of the biofilter media and a pressure sensor for measuring the pressure at which the contaminated air flows through the biofilter media. The control system may be operable to actuate the water delivery system to adjust the moisture being delivered to the biofilter in response to input received from the temperature sensor or the pressure sensor.

The sensor means may include a pH monitoring probe for measuring the pH of the biofilter media. The control system is operable to adjust the pH of the biofilter media in response to input received from the pH monitoring probe.

The biofilter system may include a humidification chamber disposed within the housing between the inlet and the biofilter media for moistening the contaminated air prior to entry of the contaminated air into the biofilter media. The contaminated air may be moistened within the humidification chamber using: (a) a pneumatic spray; (b) high-pressure water; or (c) steam. A steam generator may be operatively connected to the humidification chamber for delivery of steam thereto.

A method for manufacturing a biofilter media may comprise soaking a core material, preferably expanded glass, in water, adding adsorbent material to the granules and water and mixing, adding a bonding agent to the adsorbent material, the granules and the water and mixing, and adding microorganisms and nutrients to the adsorbent material, the granules and water, and mixing. The mixture of microorganisms, nutrients, adsorbent material, granules and water is then dried.

FIG. 1 shows an example of a biofilter system 20. The biofilter system 20 includes a housing 22 that encloses a biofilter bed 24. The biofilter system 20 may be placed above or below ground and may be operated under positive or negative pressure with or without covers.

The biofilter bed 24 has a base 26 upon which rests a column 28 of biofilter media 30. A waste gas inlet 32 provides access to the housing 22 thereby allowing a contaminated air stream to enter the biofilter bed 24. Positioned adjacent to the waste gas inlet 32 is a humidification chamber 34. The biofilter system 20 further includes an outlet 36 to allow a cleaned air stream to exit the housing 22 following treatment in the biofilter bed 24.

A water supply system 40 is operatively connected to the housing 22 to provide the required moisture (in the form of water and/or steam) to the biofilter media 30. The water supply system 40 includes a water inlet 42 for receiving water to be used for either steam generation or irrigation of the biofilter media 30. The water inlet 42 may supply water to a steam generator 44 through conduit 45. The steam generator 44 is operable to generate steam (when required) and supply it to the humidification chamber 34 via conduit 47 and waste gas inlet 32. Alternatively, and in particular in warm climates, a packed bed humidifier with water spray may be used to utilize the energy contained in the exhaust gas to provide desired humidity. Irrigation conduits 46 attached to the water inlet 42 are used to deliver water into the housing 22. The irrigation conduits 46 are furnished with spray nozzles 48 for spraying water on the biofilter media 30.

The water supply system 40 may also include a flow meter 50 disposed downstream of the water inlet 42 to control the amount of water that enters the biofilter system 20 and more specifically, the irrigation conduits 28. A drain line 52 disposed within the housing 22 allows for the removal of excess water and any waste accumulated during the cleansing and irrigation of the biofilter media 30.

The biofilter system 20 includes one or more media temperature sensors 56 (only one sensor shown) that measure the temperature of the biofilter media and one or more pressure sensors 58 (only one sensor shown) that measure the pressure at which the waste gas is flowing through the biofilter media 30. A biofilter control system 60 governs the operation of the biofilter system 20 and communicates with the media temperature sensor 56, the pressure sensor 58, and the water supply system 40. As will be explained in greater detail below, the biofilter control system 60 may actuate the water supply system 40 in response to an input signal it receives from the temperature sensor 56. More specifically, the control system 60 may adjust the temperature of the biofilter media 30 by selectively adding steam to the contaminated air stream in the waste gas inlet 32 or in the humidification chamber 34, or by irrigating the biofilter media 30 with water.

The biofilter system 10 may also have a pH monitoring probe (not shown) disposed in the outlet 36 to monitor the operating environment of the biofilter media 14. A more detailed description of the biofilter system 20 can be found in U.S. Pat. No. 5,869,323, the content of which is hereby incorporated herein by reference.

Within the biofilter system 20, a biofilter media 30 is provided to remove contaminants (such as, organic sulfides, reduced sulfur compounds, chlorinated or non-chlorinated volatile organic compounds (VOCs), ammonia and amines) from the contaminated air stream received within the housing 22. The biofilter media comprises a plurality of granules, beads, or pellets 70.

FIG. 2 conceptually illustrates an example of a granule 70 of the biofilter media 30. Each granule 70 provides a surface area upon which a biofilm containing microorganisms required to biodegrade the contaminants may be supported.

Granule 70 comprises a core 72, and a coating 74 on the core. The core comprises expanded glass. Expanded glass may be stable, inorganic, non-reactive, non-flammable, non-toxic and non-odorous, and further, may be non-biodegradable and acid resistant. In addition, expanded glass may be relatively hard and rigid, which allows the core 72 to better resist compaction from biomass growth and avoid high-gas phase pressure drop that may adversely impact on biofilter performance. By virtue of the relatively high porosity of expanded glass, core 72 tends to exhibit excellent moisture retention properties and has a relatively low bulk density. The expanded glass may be primarily composed of silica and alkali oxides (i.e. predominantly sodium oxide ($Na_2O$) and to a lesser extent, potassium oxide ($K_2O$)) with the remainder being composed of calcium oxide (CaO), alumina ($Al_2O_3$) and magnesium oxide (MgO).

An expanded glass granulate product is made commercially available by Dennert Poraver GmbH of Schllisselfeld, Germany and Poraver North America of Barrie, Ontario, under the name PORAVER™ and has been found to be suitable for use in core 72. The particle or the core may be selected by sieve separation to have a diameter of 4-8 mm. The expanded glass product is manufactured from recycled glass and has been used in the past as a component of building materials such as plasters, mortars, adhesives and fillers.

It will be appreciated that other products having similar properties to expanded glass, or being modified to have similar properties to expanded glass, may also be used for core 72. These products may include pumice, lava rock, or shale. These products may be modified these through physical, thermal or chemical processes. Similarly, it may be possible to make synthetic polymeric media for use in core 72.

The coating 74 includes at least one of, and preferably each of, a bonding agent for bonding the coating 74 to the core 72, an adsorptive agent, microorganisms, and nutrients for the microorganisms.

The bonding agent may an alkaline bonding agent such as cement or another cementitious material. The bonding agent may, for example, have the following composition: tricalcium silicate (~50%), dicalcium silicate (25%), tricalcium aluminate (10%), tetracalcium aluminoferrite (10%), and gypsum (5%). It will however be understood that the composition of the bonding agent may be adjusted to accommodate the chemical make-up of a particular waste gas stream. For instance, in the case of higher sulfur loadings, a bonding agent with a lower level of tricalcium aluminate may be employed.

The adsorptive agent may be one or more of activated carbon (a form of inorganic carbon), adsorption resin, and clinoptilolite (natural or synthetic). Preferably, some quantity of activated carbon is used because it increases the adsorption of chemicals such as reduced sulfides and aliphatic and aromatic compounds. The use of clinoptilolite may also be desirable due to its capacity for elevated cation exchange which tends to make it adaptable to different field applications. In addition, clinoptilolite is provided with a large surface area and can adsorb gases including hydrogen sulfide, ammonia, mercaptans, formaldehyde, and VOC gases from contaminated air streams.

The microorganisms present in the coating may be aerobic mesophilic bacteria or thermophilic bacteria. In applications where mesophilic bacteria populate the biofilter media 30, the biofilter system 20 may be operated at temperatures in the range of 20° C. to 40° C. Where the coating 74 includes thermophilic bacteria, an operating temperature of greater than 45° C. may be maintained in the biofilter bed 24. This can be achieved by supplying steam to biofilter media 30, for example.

A wide variety of nutrients for the microorganisms may be used. Such nutrients may include a source of organic carbon and a blend of nitrogen, phosphorus and potassium compounds, as well organic and inorganic compounds and other ingredients that may tend to support and promote bacterial growth and encourage degradation of certain contaminants. Examples of such ingredients include magnesium, manganese, inorganic or organic sulfur, calcium, iron, copper, cobalt, zinc, boron and molybdenum. In particular, the addition of zinc acetate to the coating 74 has been found to improve the removal of reduced sulfur compounds, in particular, dimethyl sulfide, from the contaminated air stream. By providing an appropriate balance of nutrients and by adjustment of nutrient concentration, it is possible to achieve high levels of growth of bacteria and thus accelerated rates of contaminant degradation.

Other additives may also be included to the coating 74, for example, to adjust the pH of the biofilter media 30 to the desired value. In certain applications, it may be advantageous to add an acid to the coating 74 to acidify the biofilter media 30. The acid may be an organic acid or an inorganic acid. However, preferably, the acid employed is phosphoric acid. It has been found that phosphoric acid ($H_3PO_4$) tends to increase the porosity and the buffering properties of the biofilter media 30. Moreover, the addition of phosphoric acid also tends to significantly increase the surface area and adsorption capacity of the biofilter media 30, allowing for better retention and bonding of the air contaminants. As an added benefit, the phosphorus from the phosphoric acid may also serve as a nutrient source to support microorganism growth. In other applications where maintaining a neutral pH is desired, a neutralizing agent, such as limestone, may be added to the biofilter media during the manufacture of same.

In some examples, the granules 70 of the biofilter media 30 may have a sphericity factor of >0.75 (with 1 being the maximum possible for an aggregation of perfect spheres). Further, in some examples, the granules 70 of the biofilter media 30 may have a particle size (i.e. diameter) in the range of 1-16 mm, and preferably in the range of 4-8 mm. This results in a range of 800 to 2000 $m^2$ of surface area/$m^3$ of media, and preferably in the range of 1000 to 1500 $m^2$ of surface area/$m^3$ of media. Surprisingly, a media of this sphericity and particle size is resistant to fouling and reduces inter-particle moisture retention resulting from irrigation compared to other media, and so provides more consistent performance due to the elimination of increased mass transfer resistance in the liquid phase that degrades performance immediately after irrigation. These parameters may be measured on the media including its coating, or on the uncoated core material.

The sphericity may be measured as follows:
1. Prepare a uniform, random sampling of media which contains 1,000 or more individual particles.
2. From this sampling, randomly draw out a subset of approximately 120 particles. To ensure there is no selection bias, use a small container to scoop out roughly 20-30 particles at a time, randomly from the large sample.
3. Measure the length of a particle 3 times, using a millimeter ruler. These measurements should be orthogonal, and encompass the largest, smallest, and intermediate length of the particle.
4. Calculate sphericity of the particle by using the formula $s=(S^2/ML)^{1/2}$, where S is the smallest measured length, L is the largest length, and M is the intermediate length.
5. Repeat steps 3 and 4 for all particles. From this, calculate the average sphericity of the sample set.

Surface area may be determined as follows:
1. Conduct a sieve analysis of the media using the following sieve openings:

| Sieve opening through which media sieved (mm) |
| --- |
| 46 |
| 18 |
| 11.5 |
| 7.9 |
| 6 |
| 3 |
| 2 |

2. Determine the weight retained on each sieve.
3. Calculate particle size on each sieve by taking an average of the size of opening of the sieve through which the media passed (A), and the size of opening of the sieve on which the media was retained (B). Assign this average size (C) to the weight fraction (F) of media retained between the two sieves.
4. Calculate surface area of each portion retained using the following formula, which assumes each particle to be a perfect sphere:

$10 \times 6 \times F/C/D$

Where D is the bulk density of the media
5. Determine total surface area by adding the area of the media retained on each sieve.

In addition, in some examples, the granules 70 of the biofilter media 30 may exhibit inter-particle water retention of 2 or 3 to 20% by volume, preferably 4-15% by volume. Inter-particle water retention is measured by soaking a weighted amount of the media in water, then allowing it to drain to remove inter-particle moisture, weighing it, and calculating intra particle moisture retention from the difference in the two weights divided by the volume of the media.

In addition, in some examples, the granules 70 of the biofilter media 30 may have a bulk specific gravity of less than 1 and preferably less than 0.5. The media 30 may have bulk density of 100-1000 kg/m3 of media volume, preferably 150-700 kg/m3 of media volume. This may reduce structural constraints on biofiltration equipment.

In addition, in some examples, the granules 70 of the biofilter media 30 may exhibit a uniformity coefficient of about 2 or less, preferably of about 1.5 or less. Uniformity coefficient is described by Dixon, C. R., 1994 in "The Application of Sand Technology for Turf Systems. http://www.turfdiag.com/sand_technology.htm." It is a measure of the variation in particle sizes for filter media and is defined as the ratio of the size of particle that has 60 percent of the material (by weight) finer than itself, to the size of the particle that has 10 percent (by weight) finer than itself (Dixon, 1994). A value of 1 represents a perfectly uniform media with one particle size. Most media have different uniformity coefficients. The higher the value of uniformity coefficient, the poorer the uniformity of a media.

In addition, in some examples, the granules 70 of the biofilter media 30 may have a relatively lower weight and lower density than the coated hydrophilic nucleus of other known biofilter media. For instance, the density of the core 72 may be 0.29 kg/L, whereas the density for the coated hydrophilic nucleus of BIOSORBENS™ particles described hereinabove is 0.65 kg/L. It will thus be appreciated that the biofilter media 30 is approximately 56% lighter than the BIOSORBENS™ biofilter media. The relatively light-weight/low density characteristics of the biofilter media 30 tend to facilitate handling of the biofilter media when charging and discharging the biofilter media 30 in the biofilter bed 24 and during maintenance and servicing operations. In particular, the biofilter media 30 may be removed from the biofilter bed 24 to permit the excess biomass collected on the surface of the biofilter media to be washed off thereby allowing recycling of the biofilter media. In this way, the clogging problems typically associated with conventional biofilter packing materials may be mitigated in the biofilter media 30.

In addition, freight costs associated with the biofilter media tend to be lower than those associated with the heavier conventional biofilter media thereby enhancing the cost effectiveness of the biofilter media 30. The media 30 may also have high chemical resistance, particularly to acidic conditions of pH as low as 0.5 and to alkaline conditions of pH as high as 13.

An example of a method of manufacturing a batch of biofilter media 30 is now generally described. The particles of the core 72, for example expanded glass particles sold under the name PORAVER™, are first soaked in a quantity of water for two to three hours. Thereafter, the adsorbent material is added to the expanded glass granules and water, and the resulting mixture is mixed. The bonding agent is then added and again the resulting mixture is mixed. Next to be added are the nutrients and microorganisms. The resulting mixture is again mixed and then allowed to dry for a pre-determined period of time.

The microorganisms can be supplied to the mixture in various ways. An organic substrate such as peat or compost (which contain microorganisms) and nutrient solution may be added to the mixture during manufacturing. In applications where compost is added to the mixture, it may not be necessary to inoculate the biofilter media since contaminants can be biodegraded using the natural microbial populations present in the compost. Such bacteria may include *Pseudomonas pseudoalcaligenes, Pseudoxanthomonas* and *Paenibacillus lautus*. These microorganisms tend to be effective in breaking down different sulfur compounds present in the waste gas and have been shown to achieve efficient contaminant removal without requiring the addition of further microorganisms by inoculation. It will however be appreciated that in certain applications it may be advantageous to supplement the naturally-occurring bacteria with additional microorganisms through inoculation of the biofilter media. This may be carried out to generally improve the performance of the biofilter system or to specifically enhance degradation of a particular compound or group of compounds.

In other applications, the microorganisms may be provided by a single strain or mixed culture of inocula grown in a separate bioreactor. The source of inoculants may be a standard laboratory bacterial growth medium such as agar or broth. These microorganisms could be added to the mixture in liquid form either during manufacturing of the biofilter media or during the operation of the biofilter system 20 (via the water delivery system 40). For instance, the biofilter media 30 may be inoculated with the following bacteria: *Thiobacillus (T) thioparus, begigiatoa, thiothrix* genera, and *T. feroxidants*.

The entire quantity of bonding agent need not be added all at the same time. In an alternative method of manufacturing, only a portion of the entire quantity of bonding agent (for instance, two thirds the amount) is added to the expanded glass granules and water then mixed before the adsorbent agent is added. The remaining quantity of bonding agent (for instance, one thirds) may then be added to the resulting mixture and mixed.

Where the biofilter media 30 includes an acid, a predetermined quantity of the acid may be added to the mixture before the addition of nutrients and microorganisms.

An example of the operation of the biofilter system 20 will now be described in greater detail. The biofilter system 20 is supplied with a waste gas stream from, for example, a rendering plant. The contaminated air enters the housing 22 through the waste gas inlet 24 typically under pressure, either positive or negative, (preferably, approximately −12 to 12 inches of water column), such that it is urged to flow through the biofilter bed 26.

As the waste gas stream flows through the biofilter media 30, contaminants undergo phase transfer from the gas phase to the liquid phase. The phase transfer of hydrogen sulfide and the usually recalcitrant, reduced sulfur compounds, such as dimethyl sulphide and dimethyl disulfide, tends to occur more rapidly in the biofilter media 30 than in conventional biofilter media. It is believed that the higher rates of phase transfer of these compounds is due to their particular affinity for the core 72. This increased affinity for the core 72 allows the biofilter system 20 to achieve higher removal efficiencies for hydrogen sulfide and the reduced sulfur compounds than were previously obtained with biofilter systems employing conventional biofilter media.

Once the contaminants have transitioned to the liquid phase, the contaminants are adsorbed onto the biofilm formed on the surface of the core 72 and then degraded by the metabolic activities of the microorganisms. Carbon dioxide and water are produced as a result of the biological oxidation of VOCs. The sulfur-based compounds may break down into sulfites ($SO_3^{2-}$), sulfates ($SO_4^{2-}$), sulfides ($S^{2-}$) or sulfur (S). These compounds can be easily flushed out of the biofilter bed 24 without the use of chemicals by washing out the biofilter media 30 with water, using irrigation at intermittent intervals.

The coarse granular configuration of the granule 70 as well as its characteristic low density/light weight tends to permit easy washing of the biofilter media to remove not only the products of the contaminant degradation but also any excessive biomass which may have accumulated on the surface of the biofilter media 30. The problems associated with high gas flow resistance and clogging encountered in known biofilter media tend to be minimized in the biofilter media 30. Accordingly, the biofilter media may be recycled, regenerated and reused with relative ease thus tending to impart to it a relatively long service life.

One advantage the biofilter media 30 is that interparticle water retention is minimized because of the nature of interparticle spaces, and the greater uniformity of particles present in the media. This results in rapid drainage. The high level of water retention in the bed that occurs during irrigation of biofilters in highly irregular media results in a drop in biofilter performance due to increase mass transfer resistance through the liquid phase. A higher rate of drainage and smaller volume of interparticle moisture retention results in a reduced change in biofilter performance immediately following irrigation.

Advantageously, the residue water from the periodic flushing of the biofilter media 30 can be discharged from the biofilter bed 24 through the drain line 52.

The water content in the biofilter media 30 may be adjusted by humidifying the air stream prior to its entry into the biofilter bed 24 and/or irrigating the surface of the biofilter media 30. Humidification of the air stream may occur in the humidification chamber 34 using, for example, one of the following moisture delivery systems: a pneumatic spray, high-pressure water or steam (not shown). The delivery of moisture to the biofilter media 30 may be accomplished through the water supply system 40, more specifically, via the irrigation conduits 46 and the spray nozzles 48.

During operation of the biofilter system 20, the temperature sensor 56 detects the temperature of the biofilter media 30 and transmits a signal to the control system 60 which may actuate the moisture delivery system or the water supply system 40 in response to that signal to cause water and/or steam to be delivered to the air stream or directly to the biofilter media. In this way, the temperature of the biofilter media may be maintained in the optimal range to best promote the sustained growth and development of the microorganisms.

The delivery of moisture in the form of water or steam may be actuated by the control system 60 in response to a signal received from the pressure sensor 58. For instance, if the pressure sensor 58 detects pressure at a particular point across the biofilter media 30 which exceeds the desired pressure range, this may be an indication that sulfur has accumulated excessively on the surface of the biofilter media 30 in that area thereby impeding proper gas flow through the media. In this case, the biofilter control system 60 may cause the water supply system 40 to irrigate the biofilter media 14 with water to wash away the sulfur build-up.

The control system 40 may also be configured to monitor other parameters in the biofilter media 30 to ensure the optimal operating conditions are maintained within the biofilter bed 24. For instance, the biofilter system 20 can include a pH monitoring probe (not shown) to periodically measure the pH in the biofilter bed 24. If the pH value measured falls outside of the desired range, an appropriate chemical solution, such as a liquid buffer, may be added through the water supply system 40. Other sensors could also monitor the need for further nutrients—these could be delivered through the water supply system 40.

The biofilter system 20 tends to have a shortened or reduced acclimation period compared to conventional biofilter systems. The biofilter system 20 can begin removing $H_2S$ and reduced sulphur compounds within less than a day and become fully operational within 48 hours of the start up operation. This reduced acclimation period may be due to the fact that the core has a higher surface area, and the adsorbent present in the coating is fully available to low level of contaminants, resulting in immediate and high level of removal.

The removal kinetics of various contaminants using a biofilter system having the biofilter media 30 was examined through performance data obtained in laboratory during initial pilot studies. The performance of the biofilter media 30 was compared to that of BIOSORBENS™, a known, high performance biofilter media currently made commercially available by the assignee of the present application, BIOREM Technologies Inc. of Guelph, Ontario, and with coated media using a conventional lava rock material. In addition, the pressure drop characteristics of the media have been compared with a shale based coated media with very similar particle size and surface area, but significantly poorer sphericity value to demonstrate the importance of sphericity in biofilter media performance.

The findings obtained from the different studies are presented in detail in the examples that follow.

In summary, by using a biofilter or system packed with biofilter media 30 as described herein, high $H_2S$ removal efficiency at high inlet concentrations in low empty bed residence times (EBRT) has been consistently obtained. More specifically, the biofilter system has achieved greater than 99% removal of 30 ppm of $H_2S$ in 15 seconds EBRT, compared with the same level of removal in 30 seconds EBRT for Biosorbens and lava rock based media. This is particularly surprising, as it is considered in the art that EBRTs in this range may cut into required safety factors in order to maintain reliable odor treatment (Easter et al., 2006). Similarly comparable removal of dimethyl sulphide from air was obtained with biofilter media 30 in comparison with Biosorbens and lava rock based media. It has also been shown that the pressure drop in a shale based coated media with similar surface area but lower sphericity is more than double that of a biofilter media 30.

In a biofilter, $H_2S$ is removed from the waste gas stream and broken down to sulfate ($SO_4^{2-}$) through biological oxidation.

It will thus be appreciated that biofilter media 30 performs better than other, known biofilter media. Whereas some conventional biofilter media are able to achieve satisfactory removal rates for hydrogen sulfide by improving biodegradation of the contaminants, the biofilter media 30 encourages phase transfer and enhance biodegradation of the contaminants. As a result, the biofilter media 30 is able to remove hydrogen sulfide and reduced sulfur compounds from waste gas streams with superior efficiency and at almost twice the rate than for the conventional media.

EXAMPLES

Example 1

A biofilter media as described hereinabove, comprising an expanded glass core and a coating provided on the core, was tested in comparison with Biosorbens™ and a lava rock coated media. Properties of each media are presented in Table 1. Note that the expanded glass coated media was much more spherical and has a sphericity value of 0.83, compared with 0.67 and 0.64 for Biosorbens and lava rock respectively.

TABLE 1

Physical properties of coated media

| Media Physical Property | Expanded Glass Coated Media (LWE 4-8) | Lava Rock Coated Media | Biosorbens ™ Coated Media |
|---|---|---|---|
| Bulk Density, kg/m3 of media | 0.290 | 0.585 | 0.835 |
| Intra particle moisture retention, m3 of water/m3 of media | 0.050 | 0.140 | 0.080 |
| Average Particle Size, mm | 5.0 | 10.1 | 8.8 |
| Particle size range, mm | 4 to 8 | 2 to 11.5 | 1.5 to 18 |
| Specific Surface area by volume, m2/m3 | 1,199 | 591.3 | 681.4 |
| Sphericity Factor | 0.85 | 0.64 | 0.67 |
| Uniformity coefficient | 1.32 | 2.92 | 2.46 |

For comparative testing, three identical columns, loaded with equal volume of media were used, and had the following characteristics:
Column ID: 8 inches
No. of sections: 2
Height of packing in each section: 1.5 ft
Total packing height: 3 ft
Volume of media in each bioreactor: 1 ft3
Sampling points located at inlet, mid-way and top.

Irrigation rates were selected for each media to minimize the amount of leachate produced. This requires a substantially higher irrigation rate for lava rock and Biosorbens (0.4 m3 water/m3 media/day), than expanded glass media (0.2 m3 water/m3 media/day), because of the larger amount of inter-particle moisture retention for the former two media. The reason why similar leachate volumes were important was to provide similar flushing rates for sulfuric acid generated as a result of oxidation of hydrogen Sulphide.

Inlet concentration in each case was 30 ppm by volume of hydrogen Sulphide in air.

The test program consisted of two campaigns:
1. 15-s Empty Bed Retention Time (EBRT) testing of LWE 4-8, Biosorbens and Lava rock media, with intermediate sampling at 7.5-s EBRT.
2. 20-s EBRT for LWE 4-8 (intermediate sampling at 10-s EBRT) and 30-s for Biosorbens and lava rock (intermediate sampling at 15-s EBRT).

Length of time over which the data is averaged are as follows:
Campaign 1: 35 days
Campaign 2: 9 days For expanded glass media (LWE 4-8), data from 5 days in Campaign 1 was excluded because of an unplanned increase in irrigation rate which affected its performance.

Results at 7.5 second EBRT are presented in Table 2:

TABLE 2

7.5-s EBRT Results

| Media | EBRT, s | Removal efficiency (RE) | Elimination Capacity (EC), g/m3/h |
|---|---|---|---|
| Expanded Glass Coated Media | 7.5 s | 85% | 16.2 |
| Biosorbens ™ coated media | 7.5 s | 47% | 8.8 |
| Lava Rock Coated Media | 7.5 s | 48% | 9.3 |

Removal efficiency and elimination capacity for the LWE (4-8) media was almost twice that of the other media.

Table 3 presents EBRT required to achieve near 100% removal and EC at this condition. The expanded glass media reached 100% in 15-s and removal of 94% in 10-s. The other two media required 30 s to achieve comparable performance. This demonstrates the superiority of the LWE (4-8) media.

TABLE 3

EBRT and EC at near 100% RE

| Media | EBRT, s | Removal efficiency (RE) | EC, g/m3/h |
|---|---|---|---|
| Expanded Glass Coated Media | 10 s | 94% | 13.4 |
| Expanded Glass Coated Media | 15 s | 100% | 9.5 |
| Biosorbens ™ coated media | 30 s | 96% | 4.5 |
| Lava Rock Coated Media | 30 s | 89% | 4.2 |

FIG. 3 presents the pressure drop in the three columns, measured close to the end of the first campaign. Note that LWE 4-8 is the expanded glass media. The pressure drop in this media is comparable to the other two media, despite its significantly lower particle size and higher surface area, further demonstrating the superiority of the invention. Another notable point, is that the lava rock based media has the highest pressure drop, despite the fact that it has the largest particle size. We attribute this to poor sphericity and uniformity coefficient of this media as described in Table 1, compared with these properties of Biosorbens and the expanded glass media.

Example 2

In this test, pressure drop of a biofilter media as described hereinabove, comprising expanded glass media and a coating provided thereon, and a fine shale based coated media was carried out. Properties of the two media are presented in

TABLE 4

| Media Physical Property | Expanded Glass Coated Media | Fine Shale Coated Media |
|---|---|---|
| Bulk Density, kg/m3 of media | 0.290 | 0.837 |
| Moisture retention, kg of water/m3 of media | 0.050 | 0.080 |
| Average Particle Size, mm | 5.0 | 5.0 |
| Particle size range, mm | 4 to 8 | 4 to 8 |
| Specific Surface area by mass, cm2/g of media | 41.4 | 14.3 |
| Mean Particle size, mm | 5.0 | 5.0 |
| Specific Surface area by volume, m2/m3 | 1,199 | 1199.2 |
| Sphericity Factor | 0.83 | 0.70 |
| Uniformity coefficient | 1.32 | 3.74 |

Figure 4:
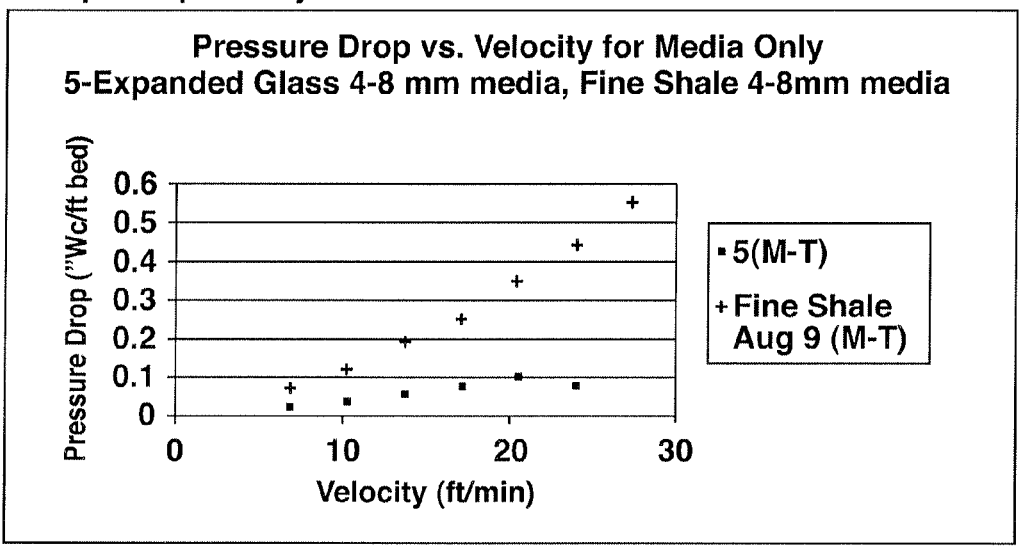
FIG. 4 is a graphical presentation of pressure drop achieved using a biofilter media as described herein as compared with another media with the same particle size but lower sphericity.

FIG. 4 presents a pressure drop profile of the two media. Note that the expanded glass media has substantially lower pressure drop than the fine shale media with lower sphericity and higher uniformity coefficient despite having similar specific surface area and particle size. This again demonstrates the advantage of this invention.

Example 3

A study was carried out to compare the performance of a biofilter media as described hereinabove, comprising an expanded glass core and a coating provided thereon, with lava rock and Biosorbens™ for the removal of dimethyl sulphide.

DMS is a volatile organic reduced sulphur compound which is one of the most difficult to treat compounds present in sewage plant exhaust streams. Properties of the media are same as presented in Table 1. Tests were carried out under the following conditions:

Expanded glass media: 15-s EBRT, 0.02 m3 of water/m3 of media/day
Lava Rock and Biosorbens: 30-s EBRT, 0.04 m3 of water/m3 of media/day
DMS feed concentration: 4-7 ppm
DMS operation: 9-h/day, 5-d/week Average results, measured once per week over a six week period (with two week interruption in DMS supply) for expanded glass media and Biosorbens™ and a roughly two week period for lava rock, are as follows:

| | |
|---|---|
| Expanded glass: | 36% RE, 0.55 g DMS/m3 of media/h EC |
| Biosorbens ™: | 29% RE, 0.27 g DMS/m3 of media/h EC |
| Lava rock: | 34% RE, 0.30 g DMS/m3 of media/h EC |

This demonstrates the superiority of the invention for removal of volatile organic carbon and reduced sulphur compounds.

Example 4

Biofilter media as described hereinabove, comprising an expanded glass core and a coating provided thereon, was tested in a small commercial system, Basys-8, designed and built by Biorem Technologies Inc. of Guelph Ontario at a sewage treatment plant located in the City of Montreal, Quebec, Canada.

| Media Physical Property | Expanded Glass Coated Media |
|---|---|
| Bulk Density, kg/m3 of media | 0.290 |
| Intra particle moisture retention, m3 of water/m3 of media | 0.050 |
| Average Particle Size, mm | 5.0 |
| Particle size range, mm | 4 to 8 |
| Specific Surface area by volume, m2/m3 | 1,199 |
| Sphericity Factor | 0.85 |

The base capacity of Basys 8 system for Biosorbens inorganic media, manufactured by Biorem Technologies Inc. is 500 cubic feet per minute [14.2 m3/min] of air operating at an empty bed residence time (media volume/air flow) of 30 seconds. However, the system was modified to increase its capacity to twice the air flow. System characteristics are as follows:

Process: Air humidification followed by biofiltration using the subject media
  Overall reactor diameter: 8 ft [2.4 m]
  Central humidification shaft diameter: 2 ft [0.61 m]
  Overall reactor height: 7 ft [2.1 m]
  Media height: 5 ft [1.5 m]
  Total media volume: 235 ft3 [6.6 m3]

The source of odorous gases was a wastewater treatment process at a City of Montreal sewage plant. Two tests were conducted;
  Test 1: Organic Sulfur Compound (OSC) removal
  Flow rate: 845 cubic feet/min [23.9 m3/min] of air
  EBRT: 16.7 seconds
  Media temperature: 34 degrees Celsius Duplicate samples were taken in Tedlar bags and analyzed using gas chromatography with sulphur SCD detector manufactured by Sievers Inc. Average results of the two samples for organic sulphur compounds are as follows:

| | Inlet gas concentration ppmv | Outlet gas concentration, ppmv | Removal Efficiency |
|---|---|---|---|
| Methyl Mercaptan (methanethiol) | 5.38 | Not detected | 100% |
| Dimethyl sulfide | 0.15 | 0.07 | 57% |
| Dimethyl disulfide | 0.39 | 0.11 | 73% |
| Total OSC | 5.93 | 0.17 | 97% |

Bed pressure drop was 0.85 inch [2.15 cm] of water column and is surprisingly low for 1.5 m deep biofiltration bed. This confirms the excellent pressure drop property of the subject media.

Test 2: Odour testing
  Flow rate: 940 cubic feet/min [26.6 m3/min] of air
  EBRT: 15 seconds
  Media temperature: 35 degrees Celsius Odour sampling and testing was conducted by Odotech Inc. of Montreal using ASTM E679-91. Inlet and outlet air characteristics were as follows:
  Inlet Air: 36,060 Odour Units/Normal m3 (OU/Nm3) of air
  Outlet Air: 1630 OU/Nm3
  Removal efficiency: 95%

The expanded glass media provided extremely high removal of organic sulphur compounds and odour at 15 second residence time and 940 cfm [26.6 m3/min] flow. This is surprising, considering that the Basys 8 system, using the Biosorbens media, is typically specified for 500 cfm [14.2 m3/min] air flow and 30 second residence time, and is expected to provide typical odour reduction of only 90%.

Example 5

Biofilter media as described hereinabove, comprising an expanded glass core and a coating provided thereon (properties listed in below was tested in a pilot, designed and built by Biorem Technologies Inc. of Guelph Ontario at a sewage treatment plant located in the City of London, Ontario, Canada.

| Media Physical Property | Expanded Glass Coated Media |
|---|---|
| Bulk Density, kg/m3 of media | 0.290 |
| Intra particle moisture retention, m3 of water/m3 of media | 0.050 |
| Average Particle Size, mm | 5.0 |
| Particle size range, mm | 4 to 8 |
| Specific Surface area by volume, m2/m3 | 1,199 |
| Sphericity Factor | 0.85 |

System characteristics were as follows:
Process: Air humidification followed by biofiltration using the subject media
  Overall reactor diameter: 4 ft [1.2 m]
  Bottom humidification system media height: 3 ft [0.9 m]
  Biofiltration media height: 6 ft [1.8 m]
  Total biofiltration media volume: 75 ft3 [2.1 m3]

Sampling points: Inlet, middle of biofiltration media, top of media

The source of odorous gases was biosolids dewatering and sludge storage at London, Ontario, Canada Greenway sewage treatment plant. Parallel tests were conducted to determine removal of reduced sulfur compounds and odor, and operating conditions were as follows;

Flow rate: 300 cubic feet/min [8.5 m3/min] of air
EBRT mid point: 10 second
EBRT total: 20 seconds
Media temperature: 22 degrees Celsius Inlet, mid-point and outlet samples were taken in Tedlar bags and analyzed using gas chromatography with sulfur SCD detector manufactured by Sievers Inc. Results are as follows:

|  | Hydrogen sulphide, ppmv | Methyl mercaptan, ppmv | Dimethyl sulphide, ppmv | Dimethyl disulphide, ppmv | Total |
|---|---|---|---|---|---|
| Inlet | 0.12 | 0.12 | 0.07 | 0.01 | 0.32 |
| Mid (10 s EBRT) | 0.01 | 0 | 0.03 | 0.02 | 0.06 |
| Removal | 92% | 100% | 57% | −100% | 81.2% |
| Final(20 s EBRT) | 0 | 0 | 0 | 0 | 0 |
|  | 100% | 100% | 100% | 100% | 100% |

Odour sampling and testing was conducted by Zorix Inc. of Toronto using ASTM E679-91, and results are as follows:

| TEST LOCATION | Time | net OTV | Geometric Mean (net OTV) | Odour Removal (%) |
|---|---|---|---|---|
| Biofilter Inlet | 11:33 AM | 6090 | 6090 |  |
|  | 11:45 AM | 6090 |  |  |
| Biofilter Mid-Point (=10 sec EBRT) | 11:32 AM | 362 | 431 | 92.9 |
|  | 11:43 AM | 512 |  |  |
| Biofilter Outlet (=20 sec EBRT) | 11:58 AM | 256 | 215 | 96.5 |
|  | 12:07 PM | 181 |  |  |

The media in accordance with the present invention provided complete removal of hydrogen sulfide and organic sulfur compounds in 20 seconds and very high removal even at 10 second residence time. Odor removal exceeded 90% even at 10 seconds. Typical removal in Biosorbens system for odor and organic sulfur compounds is 90% at 30 second residence time.

We claim:

1. A process for removing contaminants from a gas stream, the process comprising,
    a) providing a biofilter having a medium, the medium comprising granules, wherein each granule comprises a core and a coating, wherein the granules or their cores have a sphericity of 0.75 to 1, a particle size of 1 to 16 mm and a uniformity coefficient of between 1 and 2, wherein the biofilter further comprises microorganisms; and,
    b) flowing the gas stream through the biofilter at a rate providing an empty bed residence time (EBRT) of 15 seconds or less,
    wherein the contaminants comprise hydrogen sulfide, a volatile organic compound or a reduced sulfur compound, and
    wherein the coating includes one or more of a bonding agent, an adsorptive agent, and nutrients for the microorganisms.

2. The process of claim 1, wherein the medium consists essentially of granules or their cores that have a particle size of 8 mm or less.

3. The process of claim 2, wherein the granules or their cores have a sphericity of 0.8 to 1.

4. The process of claim 3, wherein the granules or their cores have a surface area of 800 to 2,000 m2/m3 of the medium.

5. The process of claim 4, wherein the granules or their cores have a surface area of 1,000 to 1,500 m2/m3 of the medium.

6. The process of claim 5, wherein the core is an expanded glass particle.

7. A process for removing contaminants from a gas stream, the process comprising,
    a) providing a biofilter having a medium, the medium comprising granules, wherein each granule compromises a core and a coating, wherein the granules or their cores have a sphericity of 0.75 to 1, a uniformity coefficient of between 1 and 1.5 and a particle size of 1 to 16 mm, wherein the biofilter further comprises microorganisms; and,
    b) flowing the gas stream through the biofilter at a rate providing an empty bed residence time (EBRT) of 20 seconds or less,
    wherein the contaminants comprise hydrogen sulfide, a volatile organic compound or a reduced sulfur compound; and
    wherein 80% or more of the granules or their cores are of a size that would be retained between square grid sieves having openings differing in width by 4 mm or less.

8. The process of claim 7, wherein the sieves comprise one sieve with 4 mm openings and another sieve with 8 mm openings.

9. The process of claim 1, wherein the granules or their cores have a uniformity coefficient of between 1 and 1.5.

10. The process of claim 1, wherein the coating comprises a bonding agent, an adsorptive agent and nutrients for the microorganisms.

11. The process of claim 6, wherein the expanded glass comprises silica and at least one alkali oxide.

12. The process of claim 7, wherein the granules or their cores have a sphericity of 0.8 to 1.

13. The process of claim 8, wherein the granules or their cores have a surface area of 1,000 to 1500 m2/m3 of the medium, and a sphericity of 0.8 to 1.

* * * * *